United States Patent
Giordano

(10) Patent No.: US 8,528,942 B2
(45) Date of Patent: Sep. 10, 2013

(54) QUICK-FIT CONNECTION

(76) Inventor: Vincenza Giordano, Brescia (IT)

(*) Notice: Subject to any disclaimer, the term of this patent is extended or adjusted under 35 U.S.C. 154(b) by 0 days.

(21) Appl. No.: 13/504,405

(22) PCT Filed: Oct. 27, 2010

(86) PCT No.: PCT/IB2010/054867
§ 371 (c)(1),
(2), (4) Date: Jun. 5, 2012

(87) PCT Pub. No.: WO2011/051895
PCT Pub. Date: May 5, 2011

(65) Prior Publication Data
US 2012/0235403 A1  Sep. 20, 2012

(30) Foreign Application Priority Data
Oct. 30, 2009 (IT) .............................. BS2009A0197

(51) Int. Cl.
*F16L 33/00* (2006.01)
(52) U.S. Cl.
USPC ............................................ 285/242; 285/93
(58) Field of Classification Search
USPC ................. 285/322, 242–245, 247, 248, 255, 285/307, 93
See application file for complete search history.

(56) References Cited

U.S. PATENT DOCUMENTS

| | | | |
|---|---|---|---|
| 3,659,880 A * | 5/1972 | Goldsobel | 285/149.1 |
| 4,705,304 A * | 11/1987 | Matsuda et al. | 285/243 |
| 6,773,039 B2 * | 8/2004 | Muenster et al. | 285/259 |
| 7,270,349 B2 | 9/2007 | Bamberger et al. | |
| 7,404,581 B2 * | 7/2008 | Baving et al. | 285/242 |
| 7,611,172 B2 * | 11/2009 | Baving et al. | 285/340 |
| 7,900,973 B2 * | 3/2011 | Herberg et al. | 285/331 |
| 8,025,315 B2 * | 9/2011 | Schreckenberg et al. | 285/45 |
| 2005/0035597 A1 * | 2/2005 | Bamberger et al. | 285/340 |
| 2007/0232147 A1 | 10/2007 | Herberg et al. | |

FOREIGN PATENT DOCUMENTS

| | | |
|---|---|---|
| EP | 1972844 A1 | 9/2008 |
| JP | 2008/0163981 A | 7/2008 |

OTHER PUBLICATIONS

International Search Report and Written Opinion for PCT/IB2010/054867, ISA/EP, Rijswijk, NL, mailed Aug. 31, 2011.

* cited by examiner

*Primary Examiner* — Aaron Dunwoody
(74) *Attorney, Agent, or Firm* — Harness, Dickey & Pierce, PLC

(57) ABSTRACT

The present invention relates to a quick-fit connection for pipes comprising a body having at least one spigot, which extends around a longitudinal axis, suitable for being at least partially inserted in the pipe, and a blocking element, suitable for working on the outside of the pipe and for cooperating with the body so as to keep the spigot engaged in the pipe. The blocking element comprises at least one annular blocking body, which identifies a passage section for the pipe and which comprises blocking teeth extending radially internally to interfere with the pipe. Moreover, the blocking element is removable from the body.

13 Claims, 2 Drawing Sheets

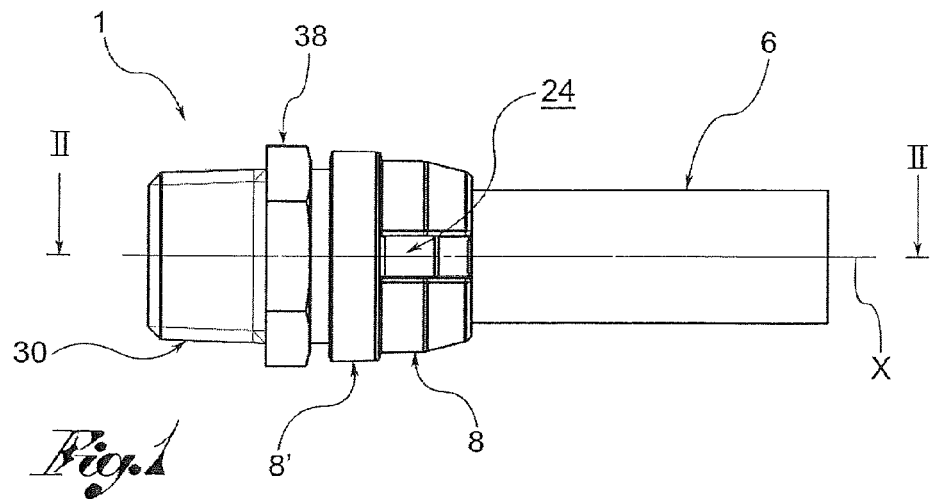
Fig.1
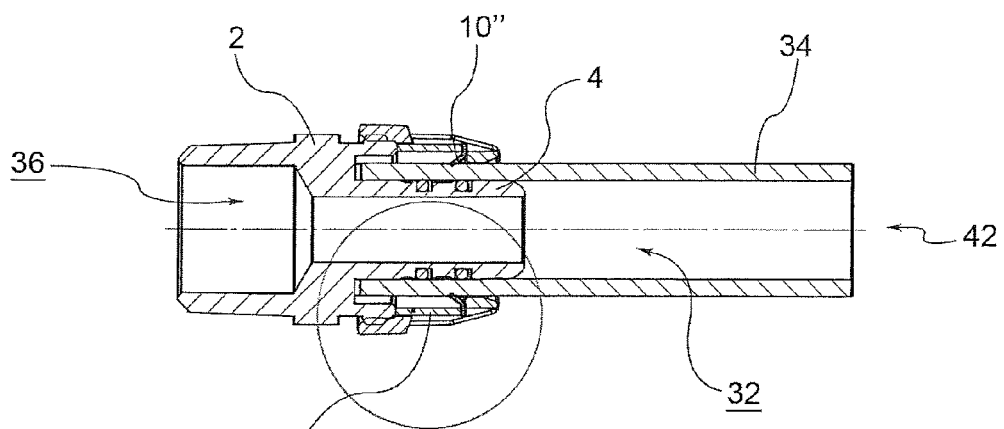
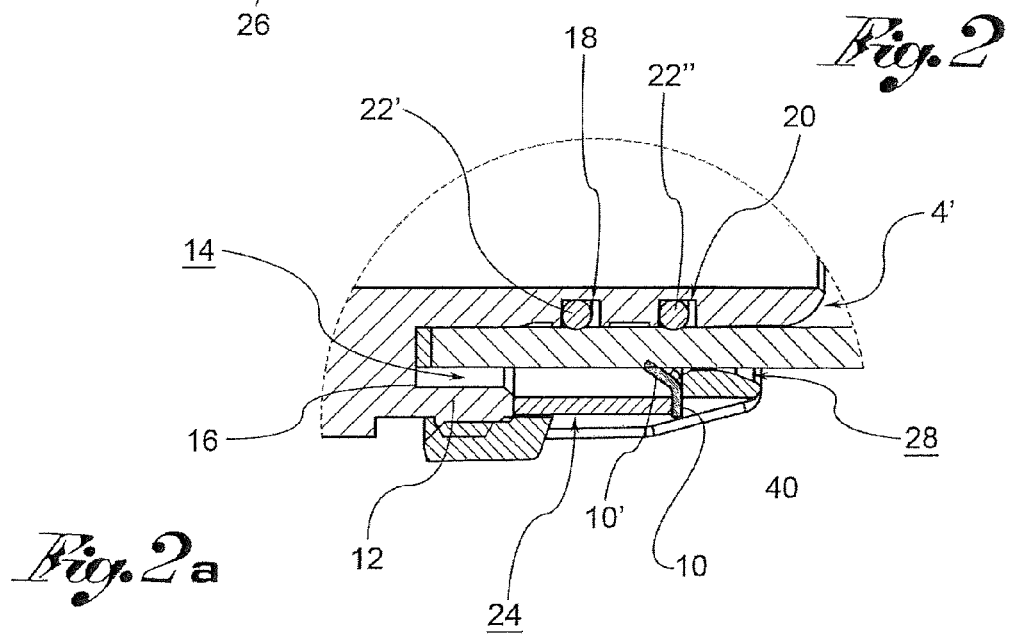
Fig.2
Fig.2a

QUICK-FIT CONNECTION

CROSS-REFERENCE TO RELATED APPLICATIONS

This application is a 371 U.S. National Stage of International Application No. PCT/IB2010/054867, filed Oct. 27, 2010, which claims priority to Italian Patent Application No. BS2009A000197, filed Oct. 30, 2009. The disclosures of the above applications are incorporated herein by reference.

DESCRIPTION

1. Field of Invention

The present invention relates to a quick-fit connection for pipes.

2. Background of Invention

In the field of connections for joining fluid supply pipes to appliances, e.g. heating and plumbing installations, the use of quick-fit connectors, i.e. connectors not requiring special tools for fitting them to the pipe, is widespread.

Such type of connector is known as "push-in" or "push-fit", in that the supply pipe is usually pushed manually into the connection, and remains in such connection position without the need for further action.

However, the prior art connections have a plurality of drawbacks.

In particular, as well as having a notoriously elevated steric hindrance, thereby causing not few design and/or installation difficulties, the connections of the prior art generally form an irreversible connection between the pipe and the connection.

Consequently, in the event that the pipe needs to be disconnected from the corresponding connection, e.g. for performing system servicing, a portion of pipe needs to be cut upstream or downstream of the connection in the flow direction, as needed.

As a result, at every servicing operation a considerable portion of pipe is lost and soon the entire pipe has to be replaced in systems undergoing frequent servicing.

The present invention therefore sets out to solve the prior art drawbacks and, in particular, those mentioned above.

SUMMARY OF INVENTION

Such objective is achieved by a connection for pipes comprising a body comprising at least one spigot suitable for being at least partially inserted in the pipe, a blocking element for working on the outside of the pipe and for cooperating with the body, so as to keep the spigot engaged in the pipe. The blocking element, removable from the body, comprises an annular blocking body defining a passage section for the pipe and comprising blocking teeth extending radially internally so as to interfere with the pipe. When the blocking element is joined to the body, the spigot projects axially beyond the blocking element, the latter having an access opening to its compartment having an inwardly flared entrance.

BRIEF DESCRIPTION OF DRAWINGS

The object of the present invention will now be described in detail, with the assistance of the attached tables, wherein:

FIG. 1 shows a lateral view of a connection which the present invention relates to, according to a possible embodiment, connected to a pipe;

FIG. 2 shows a longitudinal cross-section of the assembly in FIG. 1 along the line II-II of the latter;

FIG. 2a shows an enlargement of the area marked in FIG. 2;

DETAILED DESCRIPTION

Figure 3:
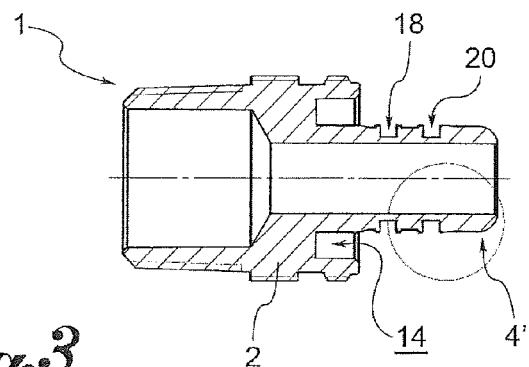
FIG. 3 illustrates only the body of the connection shown in FIG. 1.
Figure 3A:
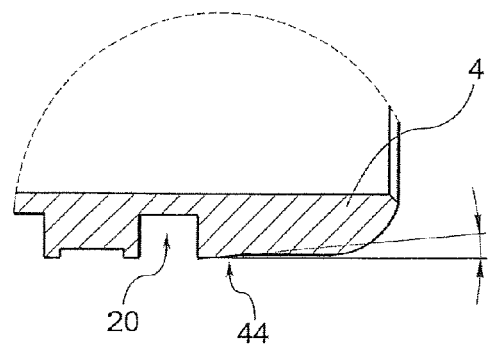
FIG. 3a shows an enlargement of the area marked in FIG. 3.

With reference to the aforesaid drawings, reference numeral 1 globally indicates a quick-fit connection for pipes.

The connection 1 comprises a body 2 comprising at least one spigot 4, which extends around a longitudinal axis X, suitable for being at least partially inserted in the pipe 6.

Consequently, the pipe 6 comprises a tubular wall 34 which defines a pipe compartment 32 suitable for at least partially housing the spigot 4.

Figure 5:
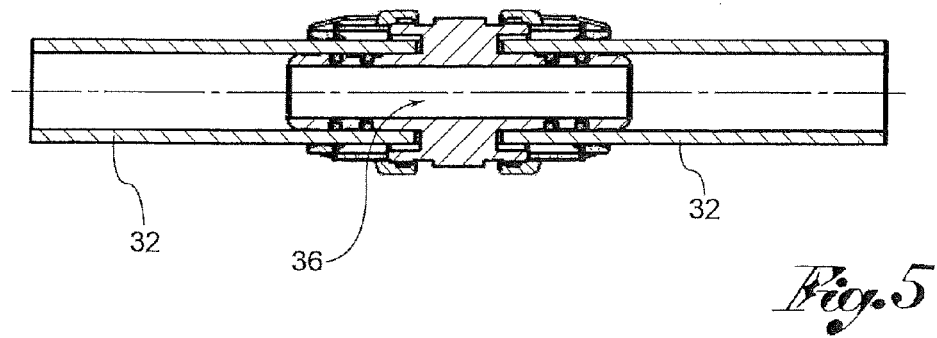
FIG. 5 shows a longitudinal cross-section of the assembly in FIG. 4 along the line V-V of the latter.

The connection 1 is preferably crossed by a passage 36 for a fluid which, in various embodiments, has a longitudinally constant (as for example illustrated in FIG. 5) or variable cross-section. This latter variation is for example illustrated in FIG. 2 and in FIG. 3.

The insertion of the spigot 4 in the pipe 6 takes place along the longitudinal axis X so that, in an assembly configuration of the pipe to the spigot, the tubular wall 34 extends around an axis substantially parallel to the longitudinal axis X.

According to a variation, the diameter of the spigot 4 on its outer surface substantially coincides with the inner diameter of the pipe 6, at least on the portion acting as the entrance of the latter.

The free end 4' of the spigot 4 has at least one portion 44 which extends radially outwardly in relation to the remaining spigot outer surface 4.

The profile of such surface comprises for example truncated-cone or smooth bosses.

According to such embodiment, the radially outermost portion 44 contributes to the realisation of a seal on the pipe 6.

The free end 4' of the spigot 4 has an externally rounded profile to facilitate insertion of the pipe 6.

In fact, as shown in FIG. 2a, the free end 4' of the spigot 4 is extremely rounded on the outside so that the insertion of the pipe 6 onto the spigot 4 is greatly simplified.

In the initial insertion phases of the pipe 6 on the spigot 4, the radially outermost portion 44 of the spigot 4 therefore cooperates with the convex rounded end 4' of the spigot 4 in performing the calibration of the pipe.

Moreover, there are at least two axially distanced annular seats 18, 20 in the external surface of the spigot 4, each suitable for retaining at least one fluidic sealing element 22', 22", advantageously an O-Ring or a gasket.

Further, at least one portion of the O-ring or gasket emerges radially externally form the annular seat 18, 20.

In other words, the annular seats 18, 20 are sized so as to only partly contain the sealing elements 22', 22".

In fact, for the embodiments envisaging both annular seats 18, 20 and a diameter of the spigot 4 substantially coinciding with the inner diameter of the pipe 6, the sealing effect is increased by the deformation or squeezing of the O-ring, on one side within its own seat, on the other side against the inner surface of the tubular wall 34.

According to a further embodiment, the body 2 comprises a connection portion 30 to a utility, e.g. a screwing portion or a threaded portion, facing the side of the body 2 axially opposite the spigot 4.

In other words, the body 2 comprises a spigot 4 on one side, and the connection portion 30 on a side opposite this.

Figure 4:
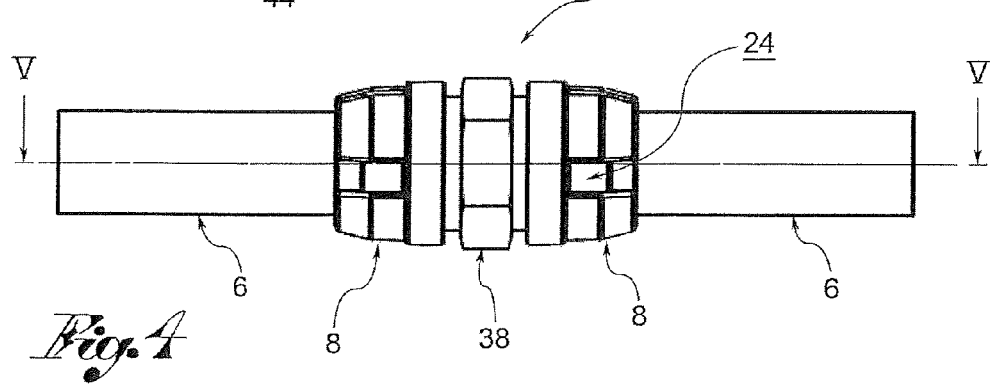
FIG. 4 shows an assembly, which the present invention relates to, comprising a connection suitable for the reciprocal connection of pipes.

According to a further variation, the body 2 comprises more than one spigot, for example two, three or four. According to such embodiment the connection 1 is suitable for the reciprocal connection of pipes or pipe sections, as illustrated for example in FIGS. 4 and 5.

For example, the aforesaid connections may be made by creating "Y"-, "T"-, "L"- or cross-shaped branches or in any case according to any number of branches even if not planar with each other.

An intermediate portion 38 of the body 2, comprised between the spigot 4 and the connection portion 30, has an outer profile suitable for cooperating with a tool.

For example, the intermediate section 38 illustrated in FIG. 1 presents, orthogonally to the longitudinal axis X, a hexagonal section for engagement with a spanner.

The connection 1 further comprises a blocking element 8, suitable for working on the outside of the pipe 6 and for cooperating with the body 2, so as to keep the spigot 4 engaged in the pipe 6.

According to a variation, the body 2 comprises a tubular portion 12, coaxial and with a diameter larger than the spigot 4, having an outer surface suitable for holding the blocking element 8.

For example, such outer surface is threaded.

The spigot 4 and the tubular portion 12 define between them an annular chamber 14 suitable for receiving the pipe 6.

As a result, during assembly of the pipe 6 to the body 2, the surfaces of the spigot 4 and of the tubular portion 12 facing each other, act as translation guides of the pipe in the annular chamber 14.

According to a further variation, the spigot 4 and the tubular portion 12 project axially from the same connection surface 16 of the body 2.

The connection surface 16 thus acts as an abutment surface for the pipe 6, when the latter is fitted onto the spigot 4.

According to one embodiment variation, the connection 1 comprises a mechanical separation element resting on the connection surface 16, that is to say positioned inside the annular chamber 14.

This way, the mechanical separation element forms a mechanical separation between the material which the connection is made of and any metallic core which some pipes, so-called multilayer, are made of. This way any electric conductivity between the pipe core and the connection is annulled and corrosion phenomena caused by parasite currents are avoided.

The spigot 4 and the tubular portion 12 are one-pieced with the body 2.

The body 2 and the blocking element 8 are made of the same material, such as a metallic material, such as brass.

The blocking element 8 comprises at least one annular blocking body 10, which identifies a passage section for the pipe 6 and which comprises blocking teeth 10', 10", extending radially internally to interfere with the pipe 6.

As a result, the blocking teeth 10', 10" narrow the passage section delimited by the annular body 10, so as to act on the tubular wall 34.

The blocking teeth 10', 10" are inclined in relation to the longitudinal axis X, as illustrated for example in the enlargement of FIG. 2a and, in particular, are inclined in the direction of insertion of the pipe 6 in the connection 1, such direction being indicated by the arrow 42 in FIG. 2.

Further, the blocking teeth 10', 10" have at least one flexible portion so that the insertion of the pipe 6 in the spigot 4 is performed easily.

According to a particular variation, the free end 40 of the blocking teeth 10', 10" is laterally smoothed and/or rounded off on the front so that, when the pipe 6 is pushed in the direction opposite that of insertion, for example on account of the pressure inside it, the blocking teeth 10', 10" cut into the surface of the pipe 6 so as to counter extraction of the pipe 6 from the spigot 4, without however penetrating the pipe 6 and thereby damaging it.

The annular blocking body 10 is retained by the blocking element 8 and is housed inside it.

Moreover, the blocking element 8 is removable from the body 2.

Consequently, the connection of the pipe 6 to the connection 1 is reversible simply by dismantling the blocking element 8 from the body 2 of the connection 1, so that works on the system do not entail any wastage of material, of either the pipe or the connection, even in the event that such works are frequent or repeated.

The body 2 and the blocking element 8 can be unscrewed from each other around an axis parallel to the longitudinal axis X, advantageously manually.

Consequently, not only the assembly of the pipe 6 to the connection 1 does not force the operator to use special tools, but neither does its dismantling.

Moreover, when the blocking element 8 is joined to the body 2, the spigot 4 projects axially beyond the blocking element 8.

This way, the contact surface between the spigot 4 and the pipe 6 is increased, as is the seal against leaks of the connection which the present invention relates to.

The blocking element 8 also has an access opening 28 to its compartment, opposite the end 8' associable to the body 2, having an inwardly flared entrance.

Consequently, the inwardly flared entrance of the blocking element 8 further facilitates assembly of the pipe 6 to the connection 1.

For the embodiments which envisage both a spigot 4 projecting axially beyond, optionally with an externally rounded or convex free end 4' and with a radially outermost portion 44, and a blocking element 8 with an inwardly flared or concave entrance, the connection 1 also acts as a calibrator, i.e. provides the reference measurements that the thickness of the tubular wall 34 of the pipe 6 must have to be used with a specific connection, thereby preventing damage to the O-rings, shifting from their seats during insertion of the pipe and, lastly, loss of their tightness.

One widespread drawback of the prior art connections consisted in fact of the need to calibrate the pipes, often using tools, before their insertion in the connection, to restore the diameter and cylindricality of the free end of the pipe to couple to the connection.

Such operation is however intrinsic during use of the connection to which the present invention relates.

The blocking element 8 identifies at least one window 24 through its thickness. When the blocking element 8 is joined to the body 2, the window 24 is radially aligned with the annular seat 18 furthest from the free end 4' of the spigot 4 and/or the annular blocking body 10.

In other words, the window 24 can be radially aligned with the annular seat 18 closer to the intermediate portion 38, a user is in the best position to verify that the pipe 6 has been sufficiently pressed onto the spigot 4, i.e. that the pair of sealing elements 22', 22" form a double fluidic barrier.

Similarly the window 24 is suitable for being radially aligned with the annular blocking body 10, so that it is easily possible to establish whether, prior to assembly, such component has been joined to the blocking element 8 or inadvertently omitted.

Consequently, according to these embodiments, the window 24 is suitable for visually checking the presence of the fluidic sealing element 22' in the annular seat 18, the presence of the annular blocking body 10, and/or to visually check that the pipe 6 has been sufficiently pressed onto the spigot 4.

According to an embodiment, the connection 1 further comprises an abutment bush 26 which can be interposed between the blocking element 8 and the pipe 6, suitable for abutting against the annular blocking body 10.

The abutment bush 26 has a dual function.

First of all, such bush 26 helps to keep the annular blocking body 10 in the right position for assembly, and to prevent it from tilting or moving away from the desired position.

Moreover, since the bush 26 is suitable for at least partially, or completely overlapping the window 24, it 26 has a protective function against the entrance of dirt inside the blocking element chamber.

The abutment bush 26 is made in at least partially transparent material.

Consequently, for the embodiments that foresee an at least partially transparent abutment bush 26, the bush 26 performs the further function of not obstructing visibility of the annular seat 18 furthest from the free end 4' of the spigot 4 and/or the annular blocking body 10.

According to a further embodiment, the abutment bush 26 identifies at least one bush window, suitable for at least partially overlapping the window 24 of the blocking element 8.

In other words, the bush window and the window 24 of the blocking element 8 have at least partially overlapping radially, openings, so as to enable visibility inside the compartment of the blocking element.

Such variation is in the cases where in order to ensure sufficient resistance to axial compression of the abutment bush 26, a thickness or material such as to prevent viewing into the aforementioned chamber must be chosen.

According to a further variation, the bush window comprises an at least partially transparent portion.

The abutment bush 26 is at least partially composed of the same material as the body 2 and/or blocking element 8.

The connection between a pipe 6 and the connection which the present invention relates to is reversible so that works on the system do not entail wastage of portions of pipe or the replacement of the entire connection, even in the event that such works are frequent or repeated.

The pipe and connection are engaged over an extensive surface and in an generating friction between them, so that the seal of the connection which the present embodiment relates to is considerably improved.

The assembly of the connection which the present embodiment relates to is simplified, in that it does not entail the use of specific tools, thanks to the slots and translation guide means provided on the connection, and thanks to the calibrating function of the latter.

The connection which the present embodiment relates to can be economically manufactured, for example by direct mechanical processing of bars or by means of a hot press method and subsequent processing to remove the burr typically used for non ferrous metal alloys.

The correct assembly of the pipe to the connection which the present embodiment relates to is widely visually verifiable given the characteristics of the blocking element.

The connection which the present embodiment relates to is of a limited size, so that the space needed for its correct installation is less than that of other types of connections, for the same number of installation manoeuvres and consequently the latter is simpler and better.

A person skilled in the art may make modifications or replacements of elements with other functionally equivalent, to the aforesaid embodiments of the connection in order to satisfy specific requirements.

Such variations also fall within the scope of protection as defined by the following claims.

Moreover, each variation described as belonging to a possible embodiment may be performed independently from the other variations described.

The invention claimed is:

1. A quick-fit connection for pipes comprising:
   a body comprising at least one spigot, which extends around a longitudinal axis to a free end, suitable for being at least partially inserted in a pipe, the spigot forming first and second axially spaced annual seats defined on an external surface of the spigot, the first annular seat being furthest way from the free end of the spigot;
   first and second fluidic sealing elements received in the corresponding first and second seats;
   a blocking element removably couplable to the body, suitable for working on an outside of the pipe and for cooperating with the body, so as to keep the spigot engaged in the pipe;
   wherein said blocking element comprises at least one annular blocking body, which defines a passage section for the pipe and which comprises blocking teeth extending radially internally so as to interfere with the pipe;
   wherein the blocking element defines a viewing window through the thickness of the blocking element; and
   wherein:
   when the blocking element is joined to the body at a first end of the blocking element, the spigot projects axially beyond the blocking element, and the viewing window of the blocking element is radially aligned with the first annular seat.

2. The connection according to claim 1, wherein the body and the blocking element are suitable for being reciprocally unscrewed around an axis parallel to the longitudinal axis.

3. The connection according to claim 1, wherein the body comprises a tubular portion, coaxial and with a diameter larger than the spigot, having an external surface suitable for holding the blocking element.

4. The connection according to claim 3, wherein the spigot and the tubular portion define between them an annular chamber suitable for accommodating the pipe.

5. The connection according to claim 3, wherein the spigot and the tubular portion project axially from the same connection surface of the body.

6. The connection according to claim 3, wherein the spigot and the tubular portion are one-pieced with the body.

7. The connection according to claim 1, wherein a free end of the spigot presents a guide with an externally rounded profile to facilitate insertion of the pipe.

8. The connection according to claim 1, wherein a free end of the spigot presents at least one portion which extends radially externally in relation to a remaining external surface of the spigot, having truncated cone or smooth bosses, suitable for performing a sealing action on the pipe.

9. The connection according to claim 1, wherein the annular blocking body is retained in a seating made in the blocking element.

10. The connection according to claim 1, further comprising an abutment bush, suitable for being interposed between the blocking element and the pipe, suitable for abutting against the annular blocking body.

11. The connection according to claim 10, wherein the abutment bush is made in at least partially transparent material.

12. The connection according to claim 10, wherein the abutment bush identifies at least one bush window suitable for at least partially overlapping the window of the blocking element.

13. The connection according to claim 10, wherein the body, the blocking element and the abutment bush are made from the same material.

\* \* \* \* \*